(12) United States Patent
Kateley et al.

(10) Patent No.: US 9,380,170 B1
(45) Date of Patent: Jun. 28, 2016

(54) SYSTEM, METHOD, AND COMPUTER PROGRAM FOR CREATING CELLULAR NETWORK PERFORMANCE INDICATORS BY CORRELATING BUSINESS DATA OF SUBSCRIBERS WITH A GEOGRAPHIC POSITION

(71) Applicant: Amdocs Software Systems Limited, Dublin (IE)

(72) Inventors: Richard Kateley, London (GB); Richard Harris, London (GB); Neil Coleman, London (GB); Jens Voigt, Dresden (DE); Mark Henry Geere, Bath (GB)

(73) Assignee: Amdocs Software Systems Limited, Dublin (IE)

( * ) Notice: Subject to any disclaimer, the term of this patent is extended or adjusted under 35 U.S.C. 154(b) by 118 days.

(21) Appl. No.: 14/266,625

(22) Filed: Apr. 30, 2014

(51) Int. Cl.
| | |
|---|---|
| *H04M 15/00* | (2006.01) |
| *H04W 4/24* | (2009.01) |
| *H04W 8/18* | (2009.01) |
| *H04W 64/00* | (2009.01) |

(52) U.S. Cl.
CPC ............. *H04M 15/58* (2013.01); *H04W 4/24* (2013.01); *H04W 8/18* (2013.01); *H04W 64/00* (2013.01)

(58) Field of Classification Search
CPC ......... H04W 4/24; H04W 8/18; H04W 16/22; H04W 24/02; H04W 24/08; H04W 64/00; H04L 43/04; H04L 43/045; H04M 15/58

USPC ......... 455/404.2–408, 414.1, 423, 456.1–457
See application file for complete search history.

(56) References Cited

U.S. PATENT DOCUMENTS

| | | | | |
|---|---|---|---|---|
| 6,628,952 | B1 * | 9/2003 | Hankins ............... | H04W 16/00 455/446 |
| 8,364,141 | B1 * | 1/2013 | Kateley ................ | H04W 24/08 370/216 |
| 2010/0093376 | A1 * | 4/2010 | del Castillo ........... | G01S 19/06 455/456.6 |
| 2011/0026506 | A1 * | 2/2011 | Macnaughtan ....... | G01S 5/0236 370/338 |
| 2011/0136501 | A1 * | 6/2011 | Britt, Jr. .............. | H04W 64/00 455/456.1 |
| 2013/0130642 | A1 * | 5/2013 | Joul .................... | H04L 41/5064 455/406 |

* cited by examiner

*Primary Examiner* — Michael Mapa
(74) *Attorney, Agent, or Firm* — Zilka-Kotab, PC

(57) ABSTRACT

A system, method, and computer program product are provided for creating cellular network performance indicators by correlating business data of subscribers with a geographic position. In use, one or more subscriber measurement reports associated with an authenticated cellular network subscriber identifier are received. Additionally, the one or more subscriber measurement reports are geo-location tagged with a geographic position estimate. Further, business data associated with the authenticated cellular network subscriber identifier is received. Moreover, the received business data is associated with the one or more corresponding subscriber measurement reports, based on the authenticated cellular network subscriber identifier, such that the business data is associated with the geographic position estimate to create one or more performance indicators.

14 Claims, 4 Drawing Sheets

SYSTEM, METHOD, AND COMPUTER PROGRAM FOR CREATING CELLULAR NETWORK PERFORMANCE INDICATORS BY CORRELATING BUSINESS DATA OF SUBSCRIBERS WITH A GEOGRAPHIC POSITION

FIELD OF THE INVENTION

The present invention relates to using a geographic position of a cellular network subscriber to create value for a service provider associated with the cellular network.

BACKGROUND

In the context of cellular networks, the ability to determine a geographic location of devices of such networks is achievable. Currently, the geographic location of the devices is not used in the context of business data, such as revenue, data plan information, billing information, roaming information, and customer lifetime value, etc., to generate business value for service providers associated with such networks.

For example, currently, business data analysis is performed in a billing system, which is a different system than a system performing Radio Access Network (RAN) analytics/optimization. Geo-location information is not utilized in the billing system.

There is thus a need for addressing these and/or other issues associated with the prior art.

SUMMARY

A system, method, and computer program product are provided for creating cellular network performance indicators by correlating business data of subscribers with a geographic position. In use, one or more subscriber measurement reports associated with an authenticated cellular network subscriber identifier are received. Additionally, the one or more subscriber measurement reports are geo-location tagged with a geographic position estimate. Further, business data associated with the authenticated cellular network subscriber identifier is received. Moreover, the received business data is associated with the one or more corresponding subscriber measurement reports, based on the authenticated cellular network subscriber identifier, such that the business data is associated with the geographic position estimate to create one or more performance indicators.

DETAILED DESCRIPTION

Figure 1:
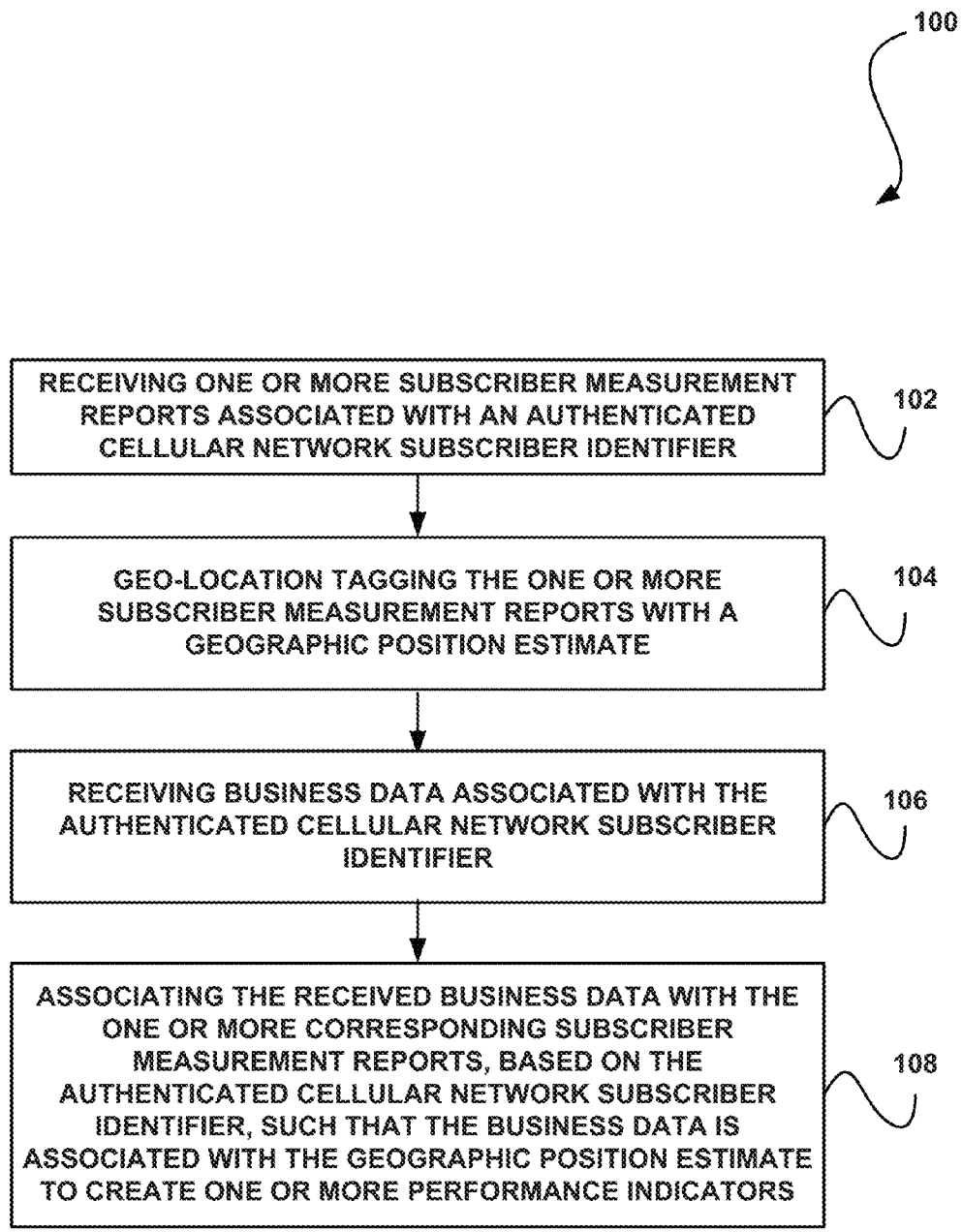
FIG. 1 illustrates a method for creating cellular network performance indicators by correlating business data of subscribers with a geographic position, in accordance with one embodiment.

FIG. 1 illustrates a method 100 for creating cellular network performance indicators by correlating business data of subscribers with a geographic position, in accordance with one embodiment.

As shown, one or more subscriber measurement reports associated with an authenticated cellular network subscriber identifier are received. See operation 102. The subscriber measurement reports may include any information associated with the subscriber and/or network usage, etc.

Furthermore, the authenticated cellular network subscriber identifier may include any identifier associated with an authenticated subscriber of the cellular network. The subscriber measurement reports may be received by any system associated with a radio access network (RAN).

Additionally, the one or more subscriber measurement reports are geo-location tagged with a geographic position estimate. See operation 104. In one embodiment, a system associated with the radio access network may tag the subscriber measurement reports.

Further, business data associated with the authenticated cellular network subscriber identifier is received. See operation 106. For example, the business data may be received from a billing system associated with a network service provider.

The business data may include any type of data associated with a subscriber and/or network usage, etc. For example, in various embodiments, the business data may include billing data, data plan data, pricing information data, status data, roaming data, application data, service usage data, and/or any combination thereof, etc. In one embodiment, the business data may include subscriber lifetime value data.

As shown further in FIG. 1, the received business data is associated with the one or more corresponding subscriber measurement reports, based on the authenticated cellular network subscriber identifier, such that the business data is associated with the geographic position estimate to create one or more performance indicators. See operation 108. Thus, the method 100 may be utilized to create a business value of a geographic position in a cellular phone network by creating new performance indicators through combining the business value (e.g. revenue, data plan, billing, roaming, customer lifetime value, etc.) of an authenticated cellular network subscriber identifier (or a group of subscribers) to a geographic location.

In one embodiment, the method 100 may further include aggregating a plurality of geo-location tagged subscriber measurement reports into geographical bins. In this case, in one embodiment, the aggregated geo-location tagged subscriber measurement reports in the geographical bins may be grouped based on measurement data for a specific service. As an example, the specific service may include a circuit-switched service or a packet switched service, etc.

In another case, the aggregated geo-location tagged subscriber measurement reports in the geographical bins may be grouped based on subscriber information. As an example, the subscriber information may include a device type associated with a subscriber. Further, in one embodiment, aggregating the geo-location tagged subscriber measurement reports into geographical bins may also include aggregating associated business data with the geo-location tagged subscriber measurement reports into the geographical bins.

Still yet, in one embodiment, the method 100 may include correlating the business data associated with the geographic position estimate with associated quality measurements. In this case, the quality measurements may be included in the subscriber measurement reports.

In various embodiments, the quality measurements may include a receive power, a number of seen cells, and/or a signal-to-interference-and noise ratio, etc. The method 100 may also include correlating the business data associated with the geographic position estimate and the associated quality measurements with a quality of experience (QoE) associated with the authenticated cellular network subscriber identifier.

The performance indicator created may be utilized to aid a service provider in calculating and/or determining various business-related decisions. For example, the performance indicators may be utilized to determine geographic-location based pricing. As another example, the performance indicators may be utilized for network rollout investment decisions. As another example, the performance indicators may be utilized for network optimization decisions. In other various embodiments, the performance indicators may be used for network quality based pricing, user experience based pricing, and/or time period based pricing.

Moreover, the method 100 may be implemented to combine customer lifetime value from billing systems with geo-located data of the same authenticated subscriber identifier, which enables a combined business/RAN performance analysis.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
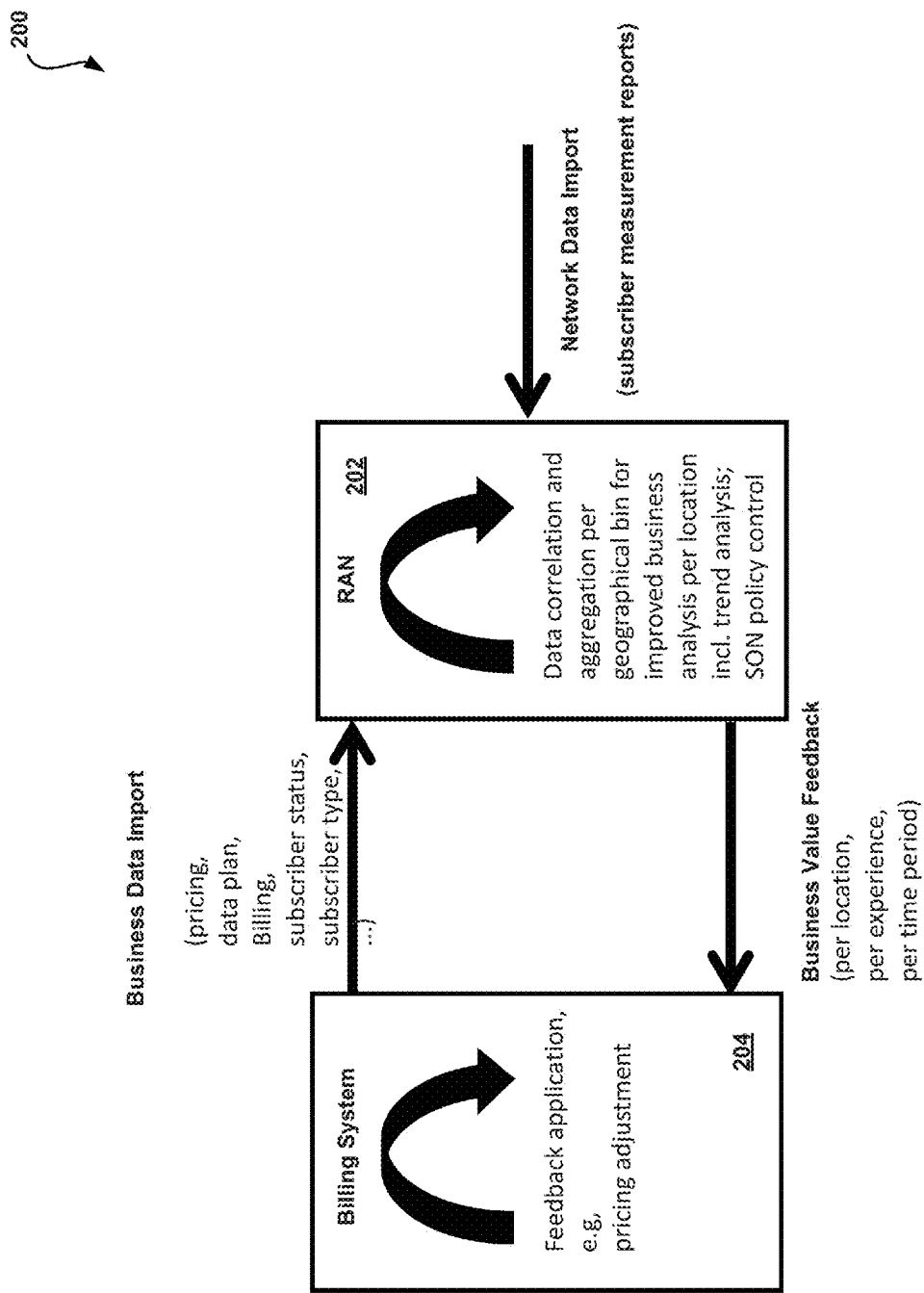
FIG. 2 illustrates a system flow for creating cellular network performance indicators by correlating business data of subscribers with a geographic position, in accordance with one embodiment.

FIG. 2 illustrates a system flow 200 for creating cellular network performance indicators by correlating business data of subscribers with a geographic position, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

As shown in FIG. 2, components of a radio access network 202 collect subscriber measurement reports from subscribers and geo-locates the reports. In this case, the geo-location tags the measurement reports with a position estimate.

In one embodiment, the geo-located measurement reports may then be aggregated into geographical bins by adding or averaging the measurement reports having estimated positions with a configurable dimension (e.g. with a configurable dimension of 50 m×50 m, etc.). Additionally, in various embodiments, the measurement report aggregations per geographical bin may be grouped into measurement data for a certain service (e.g. circuit-switched or packet switched services, HS-services or non-HS services, etc.), for a certain group of subscribers (e.g. all subscribers with the same device, etc.), or for a single subscriber only.

Further, in one embodiment, quality of service (QoS) based measurements (e.g. a signal-to-interference-and-noise-ratio, etc.) may be mapped into a subscriber quality of experience by mapping imported relevant statistics between quality of service and quality of experience.

In another embodiment, all geographical bins in which a certain cell is the dominant cell may be combined into the serving area of this cell. In this case, cell-based performance network data may be distributed to all these geographical bins.

As shown further FIG. 2, components of the radio access network 202 collect business data from subscribers (e.g. from a billing system 204, etc.). The business data may include billing data, data plan data, pricing information data, status data, roaming data, application data, service usage data, or the like, and/or any combination thereof which might result in a subscriber lifetime value.

The business data may be correlated with the measurement report data from the same authenticated subscriber identifier, then aggregated and grouped, such as for a certain service (e.g. a circuit-switched or packet switched service, an HS-service or non-HS service, etc.), for a certain group of subscribers (e.g. all subscriber with the same device), or for a single subscriber only.

Any combination, regression, or cross-correlation per geographical bin may function to create a new combined performance indicator which can be used in various business analysis use cases, as well as network optimization use cases, including Self-Organizing Networks (SON).

In one embodiment, additional data representing social media usage (e.g. an aggregated number of Twitter messages having a position in a certain geographical bin, etc.) may be used for further combination, regression, or cross-correlation with the various other data.

Further, in one embodiment, environment (e.g. vector or raster, etc.) data may be used to aggregate geographical bins belonging to a certain area (e.g. a street, a square, a campus, a mall, Wi-Fi hotspot areas, a competition network's base station locations, etc.) and to aggregate the created new performance indicators for these special areas.

All the data collection, including both business data and radio access network measurement report data (including any combination, regression, or cross-correlation, etc.) may be performed at multiple consecutive points in time. For example, the data collection may occur every 15 minutes, every hour, and/or every day, etc., to enable pattern recognition, trend analysis (e.g. prediction of subscriber and required capacity movements, etc.), and implement proactive changes in the network to adapt recognized/predicted future behavior (e.g. by proactive SON policy control, etc.). Any newly created performance indicator may be fed back into the billing system 204 for further application/use.

Furthermore, in various embodiments, the new performance indicators may be aggregated over a time period, and/or the new performance indicators may be aggregated over any useful combination of geographic positions/bins (e.g. the serving area of a cell, etc.).

Additionally, such performance indicators (or the aggregated performance indicators) may be utilized, not necessarily in the same system, for improved/targeted/prioritized network rollout investment decisions, improved/targeted/prioritized network optimization decisions, geographic-location based pricing (e.g. network quality based pricing, user experience based pricing time period based pricing, and/or any combination, etc.), and geographic-location based SON policy control (e.g. network quality based SON policy control, user experience based SON policy control, time period based SON policy control, and/or any combination, etc.).

Further, in various embodiments, the newly created performance indicators or an aggregation of indicators per geographical bin/per combination of geographical bins may be fed back into a billing system for pricing adjustments (e.g. to adjust the price of a service of subscribers according to the geographic location, the user experience, the realized network quality, etc.), business mismatch recognition (e.g. flat/low rate billing in high quality/good experience geographical bins, etc.), and business analysis pattern recognition and trend analysis (e.g. high value subscriber geographic re-locations, which billing should follow, etc.).

Additionally, the newly created performance indicators or an aggregation of indicators may be utilized to implement business-driven and subscriber experience-driven/value-driven network expansion and optimization instead of capacity-driven expansion, and/or any type (e.g. reactive and proactive) of SON policy control.

Figure 3:
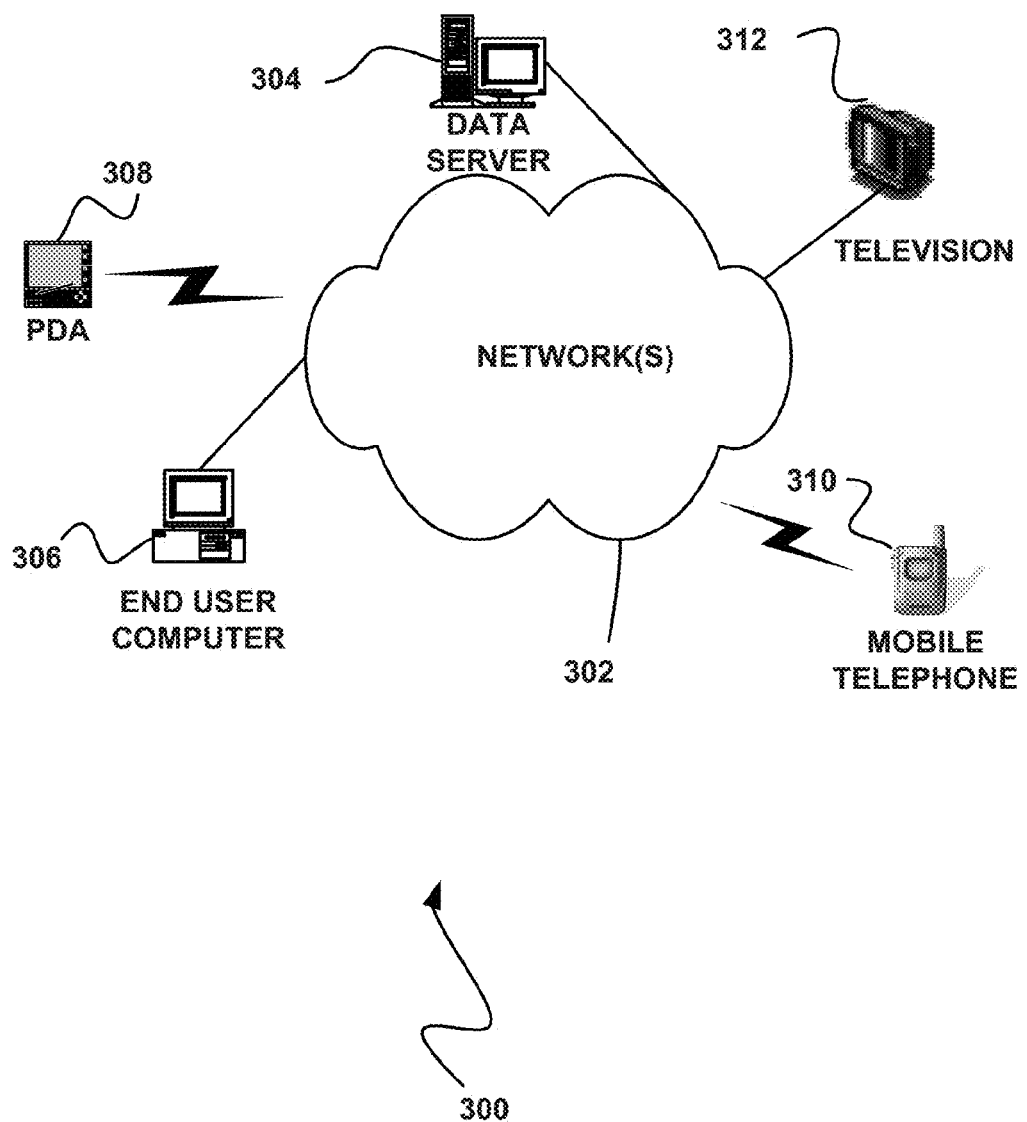
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
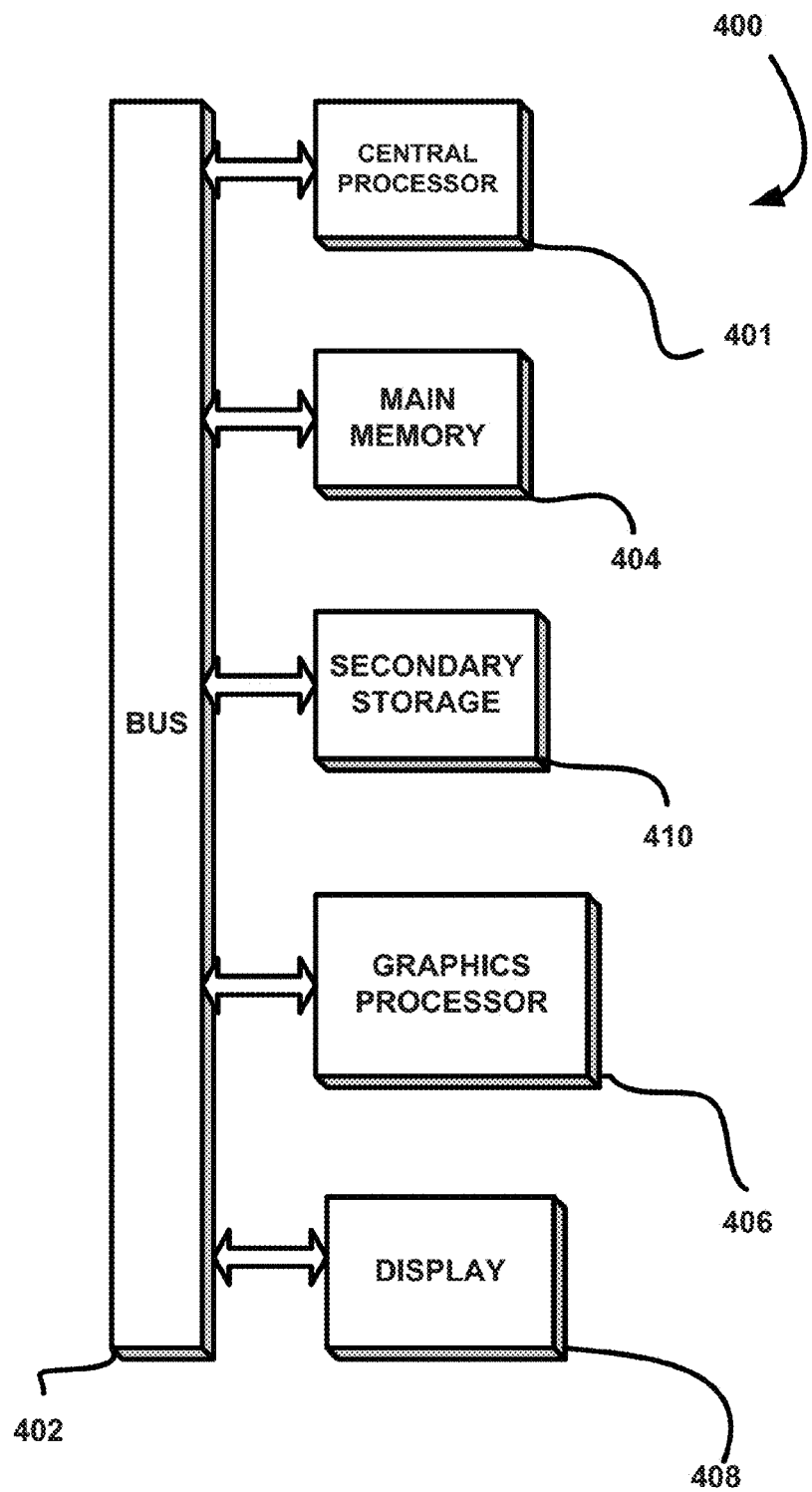
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising: computer code for (a) receiving, by a server in a radio access network, a plurality of subscriber measurement reports associated with an authenticated cellular network subscriber identifier, the subscriber measurement reports including information on cellular network usage by a subscriber of the cellular network that is identified by the authenticated cellular network subscriber identifier; (b) geo-location tagging, by the server, the one or more subscriber measurement reports with a geographic position estimate; (c) determining, by the server, a first subset of the subscriber measurement reports tagged with geographic position estimates within a predefined square dimension; (d) determining, by the server, a second subset of the first subset of the subscriber measurement reports that relate to a same cellular network service; (e) averaging, by the server, the determined second subset of the subscriber measurement reports to generate an average subscriber measurement report associated with a particular geographic location; (f) receiving, by the server, business data associated with the authenticated cellular network subscriber identifier, the business data associated with billing for the subscriber and indicating a business value of the subscriber; (g) associating, by the server, the received business data with the average subscriber measurement report, based on the authenticated cellular network subscriber identifier; (h) using the average subscriber measurement report and the associated business data, by the server, to create one or more performance indicators specific to the authenticated cellular network subscriber identifier at the particular geographic location associated with the average subscriber measurement report; computer code for repeating (a)-(h) at periodic intervals; computer code for aggregating, by the server, performance indicators created from a plurality of implementations of (a)-(h); and computer code for utilizing the aggregated performance indicators and performing, by the server, pattern recognition and trend analysis to recognize or predict future behavior from the aggregated performance indicators; and implementing, by the server, proactive changes in the radio access network to adapt recognized or predicted future behavior and to adjust the business data associated with the authenticated cellular network subscriber identifier.

2. The computer program product of claim 1, wherein the computer program product is operable such that business data includes subscriber lifetime value data.

3. The computer program product of claim 1, wherein the same cellular network service includes one of a circuit-switched service or a packet switched service.

4. The computer program product of claim 1, wherein the second subset of the first subset of the subscriber measurement reports further relate to a device type associated with the subscriber.

5. The computer program product of claim 1, further comprising computer code for correlating the business data associated with the average subscriber measurement report with associated quality measurements.

6. The computer program product of claim 5, wherein the computer program product is operable such that the quality measurements are included in the second subset of subscriber measurement reports.

7. The computer program product of claim 5, wherein the computer program product is operable such that the quality measurements include at least one of a receive power, a number of seen cells, and a signal-to-interference-and noise ratio.

8. The computer program product of claim 5, further comprising computer code for correlating the business data associated with the average subscriber measurement report and the associated quality measurements with a quality of experience associated with the authenticated cellular network subscriber identifier.

9. The computer program product of claim 1, further comprising computer code for utilizing the aggregated performance indicators for geographic-location based pricing.

10. The computer program product of claim 1, further comprising computer code for utilizing the aggregated performance indicators for network rollout investment decisions.

11. The computer program product of claim 1, further comprising computer code for utilizing the aggregated performance indicators for network optimization decisions.

12. The computer program product of claim 1, further comprising computer code for utilizing the aggregated performance indicators for at least one of: network quality based pricing, user experience based pricing, or time period based pricing.

13. A method, comprising: (a) receiving, by a server in a radio access network, a plurality of subscriber measurement reports associated with an authenticated cellular network subscriber identifier, the subscriber measurement reports including information on cellular network usage by a subscriber of the cellular network that is identified by the authenticated cellular network subscriber identifier; (b) geo-location tagging, by the server, the one or more subscriber measurement reports with a geographic position estimate; (c) determining, by the server, a first subset of the subscriber measurement reports tagged with geographic position estimates within a predefined square dimension; (d) determining, by the server, a second subset of the first subset of the subscriber measurement reports that relate to a same cellular network service; (e) averaging, by the server, the determined second subset of the subscriber measurement reports to generate an average subscriber measurement report associated with a particular geographic location; (f) receiving, by the server, business data associated with the authenticated cellular network subscriber identifier, the business data associated with billing for the subscriber and indicating a business value of the subscriber; (g) associating, by the server, the received business data with the average subscriber measurement report, based on the authenticated cellular network subscriber identifier; (h) using the average subscriber measurement report and the associated business data to create, by the server, one or more performance indicators specific to the authenticated cellular network subscriber identifier at the particular geographic location associated with the average subscriber measurement report; (i) repeating (a)-(h) at periodic intervals; (j) aggregating, by the server, performance indicators created from a plurality of implementations of (a)-(h); and (k) utilizing the aggregated performance indicators and performing, by the server, pattern recognition and trend analysis to recognize or predict future behavior from the aggregated performance indicators; and implementing, by the server, proactive changes in the radio access network to adapt recognized or predicted future behavior and to adjust the business data associated with the authenticated cellular network subscriber identifier.

14. A system comprising: a memory system; and one or more processing cores coupled to the memory system and that are each configured to: (a) receive, by a server in a radio access network, a plurality of subscriber measurement reports associated with an authenticated cellular network subscriber identifier, the subscriber measurement reports including information on cellular network usage by a subscriber of the cellular network that is identified by the authenticated cellular network subscriber identifier; (b) geo-location tag, by the server, the one or more subscriber measurement reports with a geographic position estimate; (c) determine, by the server, a first subset of the subscriber measurement reports tagged with geographic position estimates within a predefined square dimension; (d) determine, by the server, a second subset of the first subset of the subscriber measurement reports that relate to a same cellular network service; (e) average, by the server, the determined second subset of the subscriber measurement reports to generate an average subscriber measurement report associated with a particular geographic location; (f) receive, by the server, business data associated with the authenticated cellular network subscriber identifier, the business data associated with billing for the subscriber and indicating a business value of the subscriber; (g) associate, by the server, the received business data with the average subscriber measurement report, based on the authenticated cellular network subscriber identifier; (h) use the average subscriber measurement report and the associated business data, by the server to create one or more performance indicators specific to the authenticated cellular network subscriber identifier at the particular geographic location associated with the average subscriber measurement report; (i) repeat (a)-(h) at periodic intervals; (j) aggregate by the server, performance indicators created from a plurality of implementations of (a)-(h); and (k) utilize the aggregated performance indicators and performing, by the server, pattern recognition and trend analysis to recognize or predict future behavior from the aggregated performance indicators; and implementing, by the server, proactive changes in the radio access network to adapt recognized or predicted future behavior and to adjust the business data associated with the authenticated cellular network subscriber identifier.

\* \* \* \* \*